Sept. 17, 1935.  F. T. ROBERTS  2,014,669
METHOD OF AND APPARATUS FOR MAKING RUBBER TUBES
Filed July 24, 1931
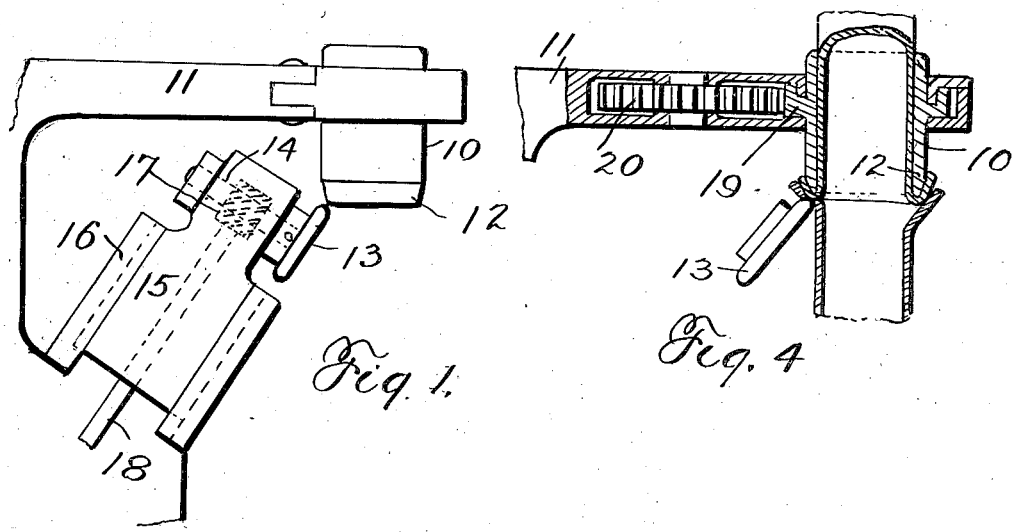
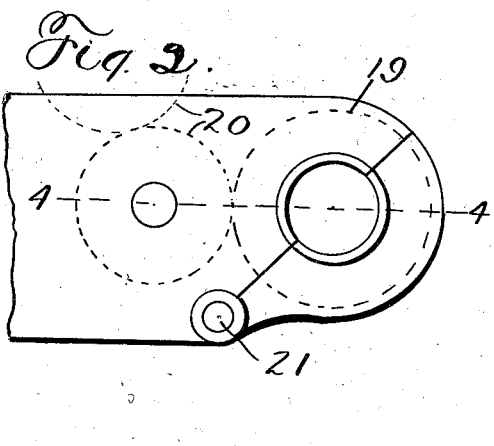
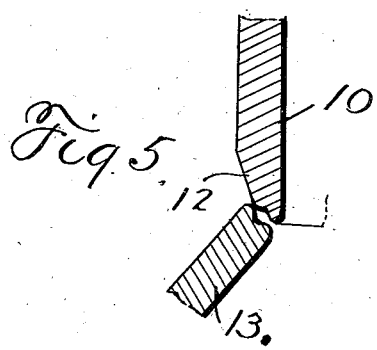

Patented Sept. 17, 1935

2,014,669

UNITED STATES PATENT OFFICE 2,014,669

METHOD OF AND APPARATUS FOR MAKING RUBBER TUBES

Fred T. Roberts, Ridgewood, N. J., assignor to Frank A. Daly, Pawtucket, R. I., trustee Application July 24, 1931, Serial No. 552,994

9 Claims. (Cl. 154—14)

My invention concerns the manufacture of tubular articles such as tire tubes and relates particularly to joining the ends of the tubular blank of unvulcanized rubber, such a blank as for example is usually produced by an extruding process. Objects of my invention are rapidity of production and high quality of product and these by means of a machine of extreme simplicity and low cost of construction. In making my invention, I take advantage of the natural adhesiveness of unvulcanized rubber so that when the tube ends are brought together and subjected to pressure, they will adhere or unite in the form of a cross-seam.

My invention consists in whatever is described by or is included within the terms or scope of the appended claims.

In the drawing:—

Fig. 1 is a side elevation of a machine embodying my invention;

Figure 2 is a top plan view thereof;

Figure 3 is a view similar to Fig. 2 showing the mandrel in an open position for the removal of the finished article;

Fig. 4 is a section on the line 4—4 of Fig. 2;

Fig. 5 is a detail view in section of coacting portions of mandrel and seaming roll having a formation that assures a strong seam.

Briefly described, my invention is practiced, in what I now consider the best embodiment thereof, by placing one end portion of an unvulcanized rubber tube within a mandrel with the extremity of the end portion protruding beyond the mandrel end, and with the opposite end portion of the tube in lapped contact with such first-mentioned tube extremity, revolving the mandrel with the periphery of a roller pressing against the overlapped end portions of the tube and rotating such roller with the result that the two ends of the tube are caused to adhere in a cross seam and surplus edge portions of the two ends pinched off. This procedure and the result are in sharp contrast with and importantly different from one where opposing ends of a tube are "cuffed", or turned back upon the tube, and then pressed together endwise throughout their circumferential extent. In my case, it will be seen that in effect, by the travel of the roll contacting portions of the two tube ends they are subjected to force at points proceeding progressively around the tube so that there is great unit pressure at each point, and it is assured that at every point circumferentially, the abutting surfaces are brought into contact and an annular seam, sealed throughout its circumferential extent, is assured.

Describing in detail what is shown in the drawing, there is a tubular mandrel, 10, journalled to revolve in bearings in an overhanging arm, 11, which is a part of the machine frame, so that the mandrel extends at least on one side beyond the arm, where it terminates in a conical and convexly rounded end, 12, over which conical and rounded end, 12, the extremity of one end of the tube is applied, the free edge portion being supported in contact with the conical or flaring surface of the mandrel. The other end of the unvulcanized rubber tube, unsupported by any mandrel, is telescoped over the tube end on the mandrel so as to overlap it slightly, and for a seaming operation is engaged by the periphery of a roller, 13, movably supported so that it may be brought towards and away from the telescoped ends of the tube, means being provided to rotate said roll 13, with its periphery in contact with the two telescoped portions of the tube ends. The roll, 13, is on a shaft, 14, journalled in a slide, 15, mounted in guides, 16, upon the machine frame and at such an angle to the axis of the tubular mandrel that the plane of the roll, 13, is oblique to such axis enough to give peripheral edge contact only of the roll with the rubber tube without side contact. Of course, this angle may be varied but it must be such that while clearing the side of the rubber tube blank, it will force the overlapped tube ends against the rounded edge of the mandrel.

For rotating the roll, 13, its shaft, 14, by gears, 17, is geared to a shaft 18, receiving power from some suitable source not necessary to be shown.

When the overlapped tube ends are caught between the roll, 13, and the adjacent end of the mandrel, the latter is revolved to bring successive portions of the tube ends, in an annular direction, to the acting edge of the roll, 13. For this purpose, the tubular mandrel, 10, has between its ends a spur gear, 19, within the arm, 11, which by a train of gears, 20, receives power to revolve it from a source not necessary to be shown in the drawing.

For the removal of the rubber tube with its ends joined together, the latter and the gear are divided or split on a diametrical line, and the supporting arm, 11, is correspondingly split or divided so that one-half of the gear and mandrel may be moved from the other half, the latter remaining in a fixed portion of the arm and thereby the portion of the tube within the mandrel liberated so that the finished annular tube may be withdrawn. Conveniently the movable portion of the arm at one end is hinged or pivoted at 21 to the stationary part of the arm, 11. Preferably a stop device may be employed to stop the rotation of the mandrel and its gear with the diametrically extending lines of division in coincidence with the line of division of the arm, 11, and if desired a holding device may be provided to retain the two parts of the gear and mandrel in closed position.

As shown in Fig. 5, the opposing tube engaging portions of mandrel end and roll periphery may, in cross-section, be shaped, as by grooving, most advantageously to act upon the telescoped overlying portions of the tube and to produce a seam of the greatest strength desired.

What I claim is:—

1. Apparatus for joining the ends of rubber tubing comprising a support for the overlapped extremities of such ends, and disc-form means for coacting with such support upon the overlapped ends of the tube, said support and means being rotatable one relative to the other while in contact with the tubing said means and said support cooperating to hold the ends of the tubing overlapped.

2. Apparatus for joining the ends of rubber tubing comprising a support for the overlapped extremities of such ends, and disc-form means for coacting with such support upon the overlapped ends of the tubing, said support and means being rotatable one relative to the other while in contact with the tubing said means and said support cooperating to hold the ends of the tubing overlapped, said support being a tubular mandrel.

3. Apparatus for joining the ends of rubber tubing comprising a support for the overlapped extremities of such ends, and disc-form means for coacting with such support upon the overlapped ends of the tubing, said support and means being rotatable one relative to the other while in contact with the tubing said means and said support cooperating to hold the ends of the tubing overlapped, said support being a tubular mandrel and said mandrel being rotatable.

4. Apparatus for joining the ends of rubber tubing comprising a support for the overlapped extremities of such ends, and means for coacting with such support upon the overlapped ends of the tubing, said support and means being rotatable one relative to the other while in contact with the tubing said means and said support cooperating to hold the ends of the tubing overlapped, said means being a positively rotated disc-form roll.

5. Apparatus for joining the ends of rubber tubing comprising a support for the overlapped extremities of such ends, and means for coacting with such support upon the overlapped ends of the tubing, said support and means being rotatable one relative to the other while in contact with the tubing said means and said support cooperating to hold the ends of the tubing overlapped, said means being a positively rotated roll, said disc-form roll when in operation rotating in a plane oblique to the mandrel axis.

6. Apparatus for joining the ends of rubber tubing comprising a hollow mandrel, means for rotating the mandrel positively including a member attached thereto, said mandrel and means being of separable parts, separable to permit removal of tubing with joined ends, and a disc-form member cooperating with an exterior surface of the mandrel upon overlapped tube ends lying between them said member and mandrel cooperating to hold the tube ends overlapped.

7. A method of joining the ends of rubber tubing which includes the acts of bringing such ends together with portions overlapping with one surrounding the other and while overlapped subjecting such portions to pressure applied in a radial direction at successive points in a circumferential direction.

8. A method of joining the ends of rubber tubing which includes the acts of bringing such ends together with portions overlapping and while overlapped subjecting such portions to pressure applied at successive points in a circumferential direction, such ends being preliminarily telescoped one over the other and the pressure being crosswise of the overlap.

9. A method of joining the ends of rubber tubing which includes the acts of placing a piece of tubing within a hollow support with an end, such piece of tubing having a free edge that extends beyond such end, overlapping contiguous ends of the two pieces of tubing, said second-mentioned piece of tubing being outwardly flared at the end and said first-mentioned piece of tubing being doubled backward over the mandrel end and encircled by said overlapping flared end and subjecting the overlapped portions of the tubing ends to pressure by an external body that presses the overlapped ends towards the mandrel end.

FRED T. ROBERTS.